F. M. OLIVER.
Car-Coupling.

No. 226,186. Patented April 6, 1880.

Attest:
A. Barthel
Chas. J. Hunt

Inventor:
F. M. Oliver
By Atty
Thos. S. Sprague

N. PETERS, PHOTO-LITHOGRAPHER, WASHINGTON, D. C.

UNITED STATES PATENT OFFICE.

FREDERICK M. OLIVER, OF GAINES' STATION, MICHIGAN.

CAR-COUPLING.

SPECIFICATION forming part of Letters Patent No. 226,186, dated April 6, 1880.

Application filed February 9, 1880.

*To all whom it may concern:*

Be it known that I, FREDERICK M. OLIVER, of Gaines' Station, Genesee county, Michigan, have invented an Improvement in Car-Couplings, of which the following is a specification.

The nature of this invention relates to certain new and useful improvements in the construction and operation of devices for coupling railway-cars together.

The invention consists in the construction, arrangement, and operation of the parts, as more fully hereinafter described, and pointed out in the claim.

Figure 1:
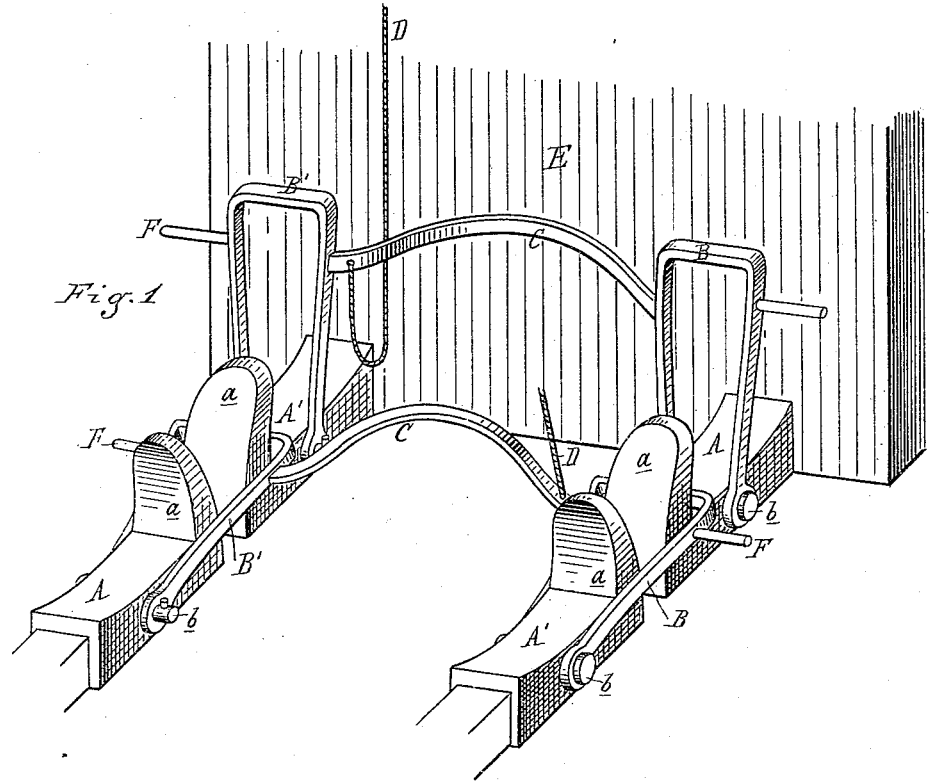
Figure 2:
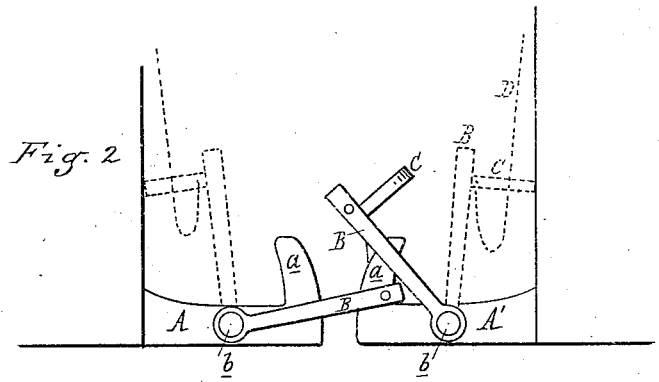

In the drawings, Figure 1 is a perspective of a section of the end of a freight-car with my improvement attached. Fig. 2 is a side elevation, showing the position of the coupling devices when in use, and in dotted lines the position in which both couplers should be placed when not in use.

In the accompanying drawings, which form a part of this specification, A A' represent two draw-bars, secured to the car E in the usual manner, the front ends of said draw-bars terminating in hooks $a$, as shown. These draw-bars are attached at equal distances from each side of the car, and preferably leaving about the same space between the draw-bars.

B B' are links, nearly rectangular in form, open at one end to embrace the draw-bars, to which they are pivoted by the bolts $b$. These links are of equal length, and are designed, when in use, to engage with the hooks $a$ upon the adjacent draw-bars, the hook ends of which are designed to act as buffers as well as for coupling purposes. These links are connected together by bails or yokes C, preferably of the form shown, so that when the links are uncoupled the curve of the bail will rest against the end of the car, as shown in dotted lines in Fig. 2, letting the links incline slightly toward the car, so that when two cars are brought together the impact will throw the links forward and compel them to couple.

Each of the links is provided with an outwardly-projecting handle, F, by means of which they may be operated from either side and outside of the cars, and each yoke may be provided with a cord or chain, D, leading to the top of the car, for uncoupling purposes.

The peculiar shape of the hooked ends $a$ of the draw-bars will allow this coupling to be advantageously used upon cars the floors of which are at varying heights.

What I claim as my invention, and desire to secure by Letters Patent, is—

For a means of coupling together railway-cars, the combination of the two draw-bars A A', constructed as described, with the two bails or pivoted links B B', said links being connected together by the yoke C, and designed to engage with similar draw-bars on adjacent cars, substantially as and for the purposes described.

FREDERICK M. OLIVER.

Witnesses:
H. S. SPRAGUE,
CHARLES J. HUNT.